Feb. 20, 1962 E. L. BOWMAN 3,021,565
STABILIZER FOR HONEYCOMB CORE
Filed May 9, 1960 2 Sheets-Sheet 1
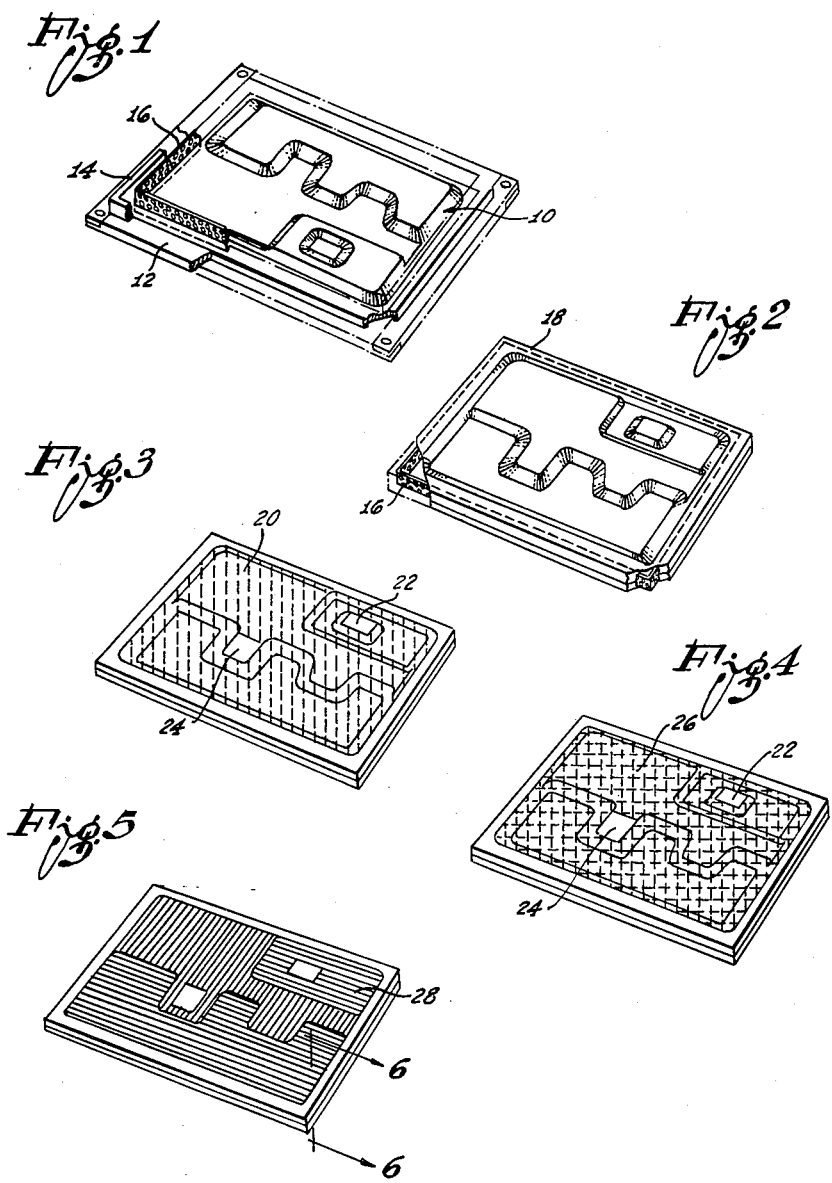
INVENTOR:
Eldon L. Bowman
By Willard M. Graham
Agent.

Feb. 20, 1962 — E. L. BOWMAN — 3,021,565
STABILIZER FOR HONEYCOMB CORE
Filed May 9, 1960 — 2 Sheets-Sheet 2
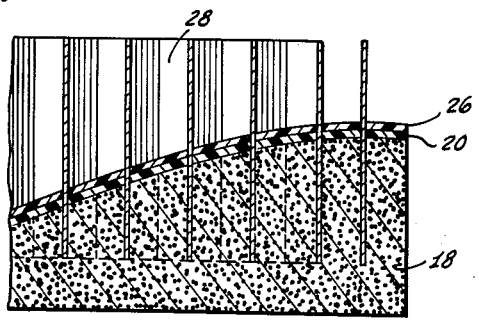
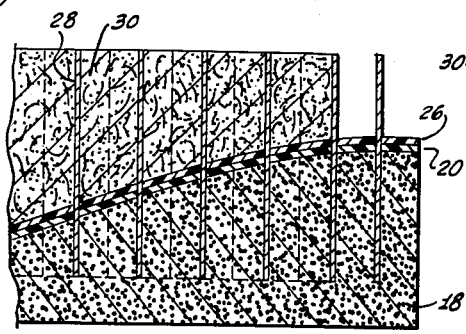
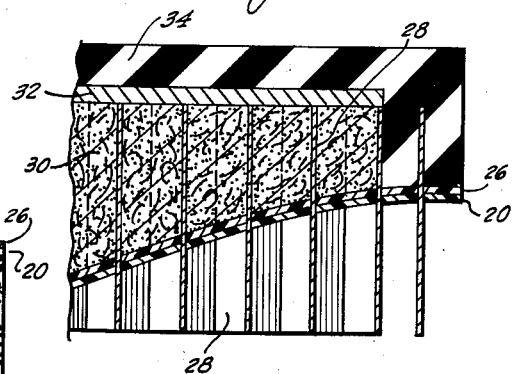
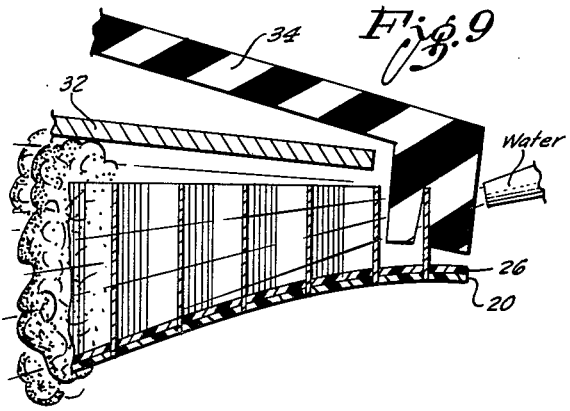
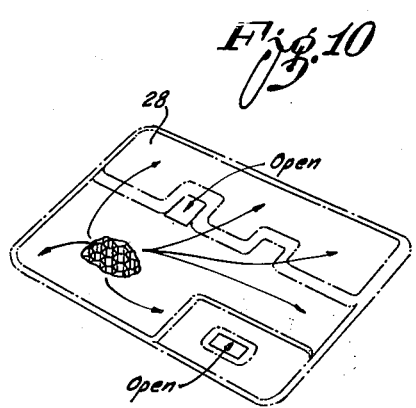
INVENTOR:
Eldon L. Bowman
Willard M. Graham
Agent.

3,021,565
STABILIZER FOR HONEYCOMB CORE
Eldon L. Bowman, Redondo Beach, Calif., assignor to Northrop Corporation, Beverly Hills, Calif., a corporation of California
Filed May 9, 1960, Ser. No. 27,624
7 Claims. (Cl. 18—47.5)

This invention has to do with a method for stable masking a cellular material such as a metal honeycomb object prior to contouring thereof. This is a continuation-in-part of patent application bearing the Serial Number 768,800, having the title of "Method for Chemical Milling Honeycomb Material," the inventor being Eldon L. Bowman, now Patent No. 2,981,612, issued April 25, 1961.

Contouring, shaping, and the mere cutting of honeycomb material provide very peculiar problems, the reason being that the material is essentially a "flabby" or unstable accordion structure. It has been extremely difficult, if not impossible, to provide honeycomb core that has, in combination, acute compound curves, feathered or very fine tapered edges, and openings located closely adjacent the curves.

Simple (mono-directional) forming can be done rather easily. The common technique is to use a bending brake or equally applicable equipment. Lack of ductility of the honeycomb structure and plasticity in the adhesive bond for the honeycomb make it difficult to form the material by physical strain. Thus, the degree of forming is limited to that attainable by cell distortion, and varies with cell shape and size. In compound-curvature forming, this is a particular problem.

Expanded metal honeycomb is obviously a difficult material to hold for machining faces without crushing or burning the cell walls, and the problem is magnified as foil thickness is reduced. But, when honeycomb core material is expanded, some holding—and often stabilizing—method or methods is required. Also, peculiar problems occur when the honeycomb core is thick and the cells are large or small or a combination of both.

Many forms of equipment and tooling, particularly designed for honeycomb core work, have been tested, some of which have been adopted. None have been able to provide acute compound curves, feathered edges, and openings within or adjacent certain areas without a certain amount of undesirable distortion and mutilation.

An object of this invention is to provide a method of stable masking cellular materials and provide acute compound curves, openings in or adjacent certain areas, and tapered or feathered edges, all to extremely accurate tolerances.

Another object of this invention is to provide a method of stable masking cellular materials whereby the substances used are relatively inexpensive, readily available and some, after use, are recoverable.

Another object of this invention is to provide a method of stabilizing honeycomb core in such a manner that the stabilizing material is readily removed when desired.

A yet further object of this invention is to provide a method of stable masking cellular materials whereby the process may be carried out with a minimum amount of skilled supervision while at the same time obtaining maximum satisfactory results.

Briefly, the invention comprises preparing a contoured mold from a master pattern. Preferably, a rubber-like masking material is applied and cured to the contoured surface of the mold. The honeycomb structure, preferably in sheet or panel form, is inserted through the masking into the mold to the desired depth. The exposed portions of the cells of the honeycomb are stabilized by applying a moistened material thereinto. Over the moistened material is applied a retaining seal. The mold is removed from the honeycomb structure, such as by the application of water or other liquid. The exposed honeycomb structure is then removed by any suitable means. This gives a contoured structure. The retaining seal and stabilizing material may then be removed.

FIGURE 1 is a perspective view, illustrating a master pattern used in the process.

FIGURE 2 is a perspective view, illustrating a mold made from the master pattern.

FIGURE 3 is a perspective view, illustrating the mold with a lining or masking material applied thereto.

FIGURE 4 is a perspective view, illustrating a release and secondary mask material applied over the principal mask material.

FIGURE 5 is a perspective view, illustrating the honeycomb material as applied to the mold.

FIGURE 6 is an enlarged cross-sectional view taken on line 6—6 of FIGURE 5, looking in the direction indicated.

FIGURE 7 is a view, illustrating the honeycomb material of FIGURE 6, filled with a cell stabilizing mixture.

FIGURE 8 is a cross-sectional view illustrating the seal as applied over the stabilizing mixture and with the mold removed.

FIGURE 9 is an enlarged, cross-sectional view illustrating the removal of the seal and stabilizing mixture.

FIGURE 10 is a perspective view, illustrating the contoured and completed panel of honeycomb core material.

Referring to the drawings for a more detailed description of the present invention, 10 broadly designates a master pattern having compound curves, tapered or feathered edges and the like, as may be determined by referring to FIGURE 1. The pattern per se is placed within a breakaway frame 12 having side rails 14. Between the rails and the pattern and defining the latter is a perforated member 16 that has for its purpose the reinforcing of the edges of the mold illustrated in FIGURE 2. It is virtually impossible to machine, in any way, the curves and depressions because of their location and form characteristics. Many structures include such panels as represented by the master pattern shown. It is to be understood that the illustrated pattern 10 is merely representative of innumerable configurations that may be shown.

The frame 12 and rails 14 function as a container or retainer for the preparation of the mold and also function as a means for surfacing the base of the mold and provide a predetermined mold thickness.

A disposable release material or agent, polyethylene film, can be applied to the master pattern by the well known vacuum bag method. This procedure is adopted for the reason that the sharp corners and depressions must be well defined in order that an accurate mold may be obtained. Obviously, other release agents, such as paraffin wax, may also be applied. Likewise the release agent can be omitted, but without it there is difficulty of obtaining release for some contours.

The master pattern, preferably with the release agent thereon, is then coated with a readily removable material, such as plaster, which after drying can be dissolved in water. A suitable composition consists of talc and a combination of 20–80 parts talc and breakaway plaster. These are thoroughly mixed dry until no lumps are present. The optimum combination is 30 parts talc and 70 parts breakaway plaster. The above mixed ingredients are added to 100–125 parts of water, 115 parts optimum. The materials are thoroughly mixed together, powder to water, to prevent the formation of lumps and provide a slurry. The slurry is poured into and over the pattern until the retainer frame 14 is filled and the upper exposed surface of the slurry, when dry, will provide a flat surface. The slurry is to set in the pattern, at room temperature, for 15–45 minutes, 30 minutes being optimum. The slurry, although still retaining some water, sets up solid in the time stated to provide a plaster mold 18, FIGURE 2, that is very weak and readily dissolved in water. Likewise plastics containing a water soluble binding agent can be used. Various other mold materials may be used, but preferably the mold formed should be porous or otherwise compressible in order to avoid distortion.

After the material has become solid the frame 12, rails 14, release agent and the mold 18 are removed from the pattern 10. The mold is, of course, a negative of the pattern 10 and the edge reinforcement 16 is retained embedded in the mold.

The plaster mold 18 of the composition illustrated is dried in an oven for 3–24 hours at a temperature between 120° F. and 250° F. In the completely dry state, the mold is very porous and very smooth and additional strength is obtained. The porosity of the mold is minute and for all intents and purposes not visible to the unaided eye. If the mold is dried at a temperature above 250° F., destructive checking and cracking may occur.

Following the complete drying of the mold 18, a liquid masking or lining material 20 is preferably applied. However, those areas 22 and 24 which define openings, in the final product, may not be covered, FIGURES 3 and 4. Extreme care is exercised to assure the proper application of the lining or masking material 20. The mask consists of 90–110 parts of a plastisol, such as a rubber latex containing sulfur or other vulcanizer, 10–30 parts of an inert filler, such as silica flour, and 0.5–1 part of coloring material. The optimum amounts of the materials are 100 parts of plastisol, 20 parts filler, and preferably 0.5 part of coloring material, such as lamp black. These materials are thoroughly mixed together and brushed on, or otherwise applied, to the mold in the areas previously mentioned. Addition of the coloring material is optional and need not be used if not desired.

The mold preferably with the mask or lining applied is then heated to about 180° F. for 15 to 30 minutes or until the coating or lining jells, but is not completely cured. However, the same process can occur at room temperature or any temperature between that of the room and 180° F. The partial curing takes longer at temperatures below 180° F.

The coating, masking, or lining, as applied to the mold, is not to be over 1/8" thick and 1/16" is preferred. The masking, in the partially cured condition, has very little elastic strength and, as a result, can be easily cut with a relatively sharp edge.

Another application of a release and secondary mask composition 26 is applied to the masking material 20. The secondary mask and release composition consists of 1–3 parts cellulose acetate butyrate dissolved in 3–6 parts trichlorethylene; 1 part of the former to 4 parts of the latter being optimum. Aluminum powder in the amount of 5% is added to the above composition. The aluminum powder is not just added for pigment purposes. It does increase the masking and release properties of the composition. Three or four coats of the release composition are applied to the masking material 20. The thickness of the composition 26 should be approximately .005 inch thick. This composition 26 not only prevents adhesion or sticking during the latter operations, but also helps to ensure a good seal of the mask 20 in the honeycomb cells.

The next step in the method is to place the mold 18 in a press and a sheet of honeycomb material 28, of the desired dimensions and cell size, is placed over the mold. The press, very accurately controlled, is lowered and the core is forced through the masking material 20, release agent, if present, into the mold 18 to the proper depth, FIGURES 5 and 6. An insertion rate of about .032" per minute is satisfactory. All of the honeycomb material 28 in some instances, as illustrated, may be urged into the mold 18. That part of the honeycomb material entirely forced into the mold provides for the openings. In other words, the shape of the mold will determine the location of the openings. Small quantities of distilled water, which function as a lubricant, may be applied to the honeycomb material. The excess masking materials 20 and 26 are carefully trimmed or removed from the mold.

After the honeycomb material 28 is urged into the mold 18, the entire assembly is placed in an oven maintained at a temperature of 250° F. to 350° F., the optimum being 300° F. At the temperature specified, the masking material 20 completely cures, flows slightly, seals the cuts made by the honeycomb material 28 and lightly bonds to the exposed honeycomb material. The curing time for the masking material 20 is 25 to 45 minutes, and preferably 30 minutes. In the cured state, the coating material becomes elastic.

Again the frame 12 and rails 14 are placed about the mold 18. A mixture of silica and plaster 30 is prepared, and poured into the exposed cells of the honeycomb material 28 in the manner illustrated in FIGURE 7. All the peripheral cells of the honeycomb material 28 are left empty. The composition of the plaster is the same as that for the mold. The composition of the mixture is about two thirds silica or sand, very finely ground, and one third plaster. A small amount of water is added to the mixture for the purpose of providing a binder or to bind the plaster and silica together. The plaster and sand may be readily removed in the final steps by the application of a jet or spray of water. A plate 32 is placed on the silica-plaster mixture 30. The plate 32 has a dimension that is smaller than the honeycomb core. In other words, all the peripheral cells of the honeycomb core structure are exposed. A hot melt composition 34 is prepared and poured over the plate 32 and into the exposed peripheral honeycomb cells. The hot melt preferably consists of about 60 percent vinyl resin (copolymer of vinyl acetate or vinyl chloride) and 40 percent di octyl phthalate, but other materials may be used.

The procedure for preparing and pouring the hot melt 34 is as follows: While the masking or lining material 20 is in the oven being cured, the hot melt is being prepared. When the cured masking material is removed from the oven and before it has cooled, the hot melt is poured in the manner previously described. The open peripheral cells of the honeycomb material 28 are completely filled. The hot melt is permitted to cool at room temperature. In the cooled state, the hot melt material 34 is elastic.

After the hot melt is completely cooled, the plaster mold 18, which is dissolved by water, is washed away by exposing the same to fine jets of hot water. The mask material 20, the release composition 26, the honeycomb material 28, and the hot melt 34 are not water soluble. Once the plaster mold material 18 is removed, a structure such as seen in FIGURE 8 is obtained.

It is to be noted that the cells of the honeycomb material 28 which were embedded in the mold 18 are now completely exposed.

The honeycomb material 28, as it is seen in FIGURE 8, is then subjected to any suitable means, such as sandblasting, for the removal of the exposed core. Additionally, a heat resistant material such as a silicone can be applied to the masking 20 and flame may be used to remove the exposed core material. The masking material 20 being elastic and bonded to the core cell walls will stop the removal action. In other words, the masking material 20 will expand over the cell walls of the honeycomb material 28 to stop the removal action.

FIGURE 9 illustrates the removal of the hot melt 34, plate 30 and silica-plaster mixture 32. Any mechanical means, such as the use of the hands, may be used to remove the hot melt and plate. As FIGURE 9 illustrates, a jet or spray of water is used to remove the silica-plaster mixture.

The hot melt 34 is reclaimed to be used again.

The final panel of shaped honeycomb core 28 may be seen in FIGURE 10. Attention is directed to the fact that it has the same configuration as the master pattern illustrated in FIGURE 1.

The silica-plaster mixture also has an additional benefit. When the exposed cells of the honeycomb core structure are submitted to removal by a chemical bath, they function as a ballast to hold the assembly in the chemical bath or tank. The assembly, in the absence of additional ballast, tends to float which, in turn, tends to remove some of the honeycomb core cells from the chemical action.

Additionally, silica or sand may be used without plaster and plaster may be used without sand. However, much greater care to details with regard to filling the honeycomb structure and sealing must be exercised.

While, in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. A method of stable masking honeycomb material comprising: constructing a mold of a water soluble material; coating the upper surface of said mold with a masking material which is insoluble in water; forcing a section of honeycomb material through said masking material and into said mold a predetermined distance whereby a portion of said honeycomb material remains above said masking material to define a plurality of exposed cells; filling said exposed cells with a water soluble material; sealing said exposed cells with a material which is insoluble in water whereby said exposed cells are rendered fluid tight; and removing said mold from said honeycomb material by absorbing the same in water.

2. A method of stable masking honeycomb material comprising: constructing a mold of a water soluble material; shaping the upper surface of said mold into a contoured surface; coating the contoured surface of said mold with a masking material which is insoluble in water; forcing a section of honeycomb material through said masking material and into said mold a predetermined distance whereby a portion of said honeycomb material remains above said masking material to define a plurality of exposed cells; filling all but the outermost of said exposed cells with a water soluble material; filling the outermost exposed cells and sealing the remainder of said exposed cells with a material which is insoluble in water thereby rendering said exposed cells fluid tight; and removing said mold from said honeycomb material by utilizing water sprays.

3. The method of claim 2, wherein the honeycomb material is an expanded metal sheet.

4. The method of claim 2, wherein the surface of the mold is coated with a plastisol prior to inserting the honeycomb structure.

5. The method of claim 1, wherein the honeycomb structure is an expanded metal sheet.

6. The method of claim 1, wherein the surface of the mold is coated with a plastisol prior to inserting the honeycomb structure.

7. The method of claim 1, wherein the sealing is a hot melt composition.

References Cited in the file of this patent

UNITED STATES PATENTS 2,110,530   Saives _____ Mar. 8, 1938